Aug. 23, 1927. W. H. O'NEILL Re. 16,720

CLOTH GAUGE

Original Filed Nov. 16, 1925

Inventor

W. H. O'Neill

By Clarence A. O'Brien

Attorney

Reissued Aug. 23, 1927.

Re. 16,720

UNITED STATES PATENT OFFICE.

WALLACE H. O'NEILL, OF HAZLETON, PENNSYLVANIA.

CLOTH GAUGE.

Original No. 1,613,289, dated January 4, 1927, Serial No. 69,540, filed November 16, 1925. Application for reissue filed June 13, 1927. Serial No. 198,666.

My present invention has to do with weaving and more particularly silk weaving; and it contemplates the provision of a cloth gauge, designed more particularly for use as an adjunct of a silk weaving loom and possessed of the practical advantages and the capacity of function hereinafter ascribed to it.

With the foregoing in mind, the invention in all of its details will be fully understood from the following description and claims when the same are read in connection with the drawings, accompanying and forming part of this specification, in which:—

Similar numerals of reference designate corresponding parts in all of the views of the drawings.

Figure 1:
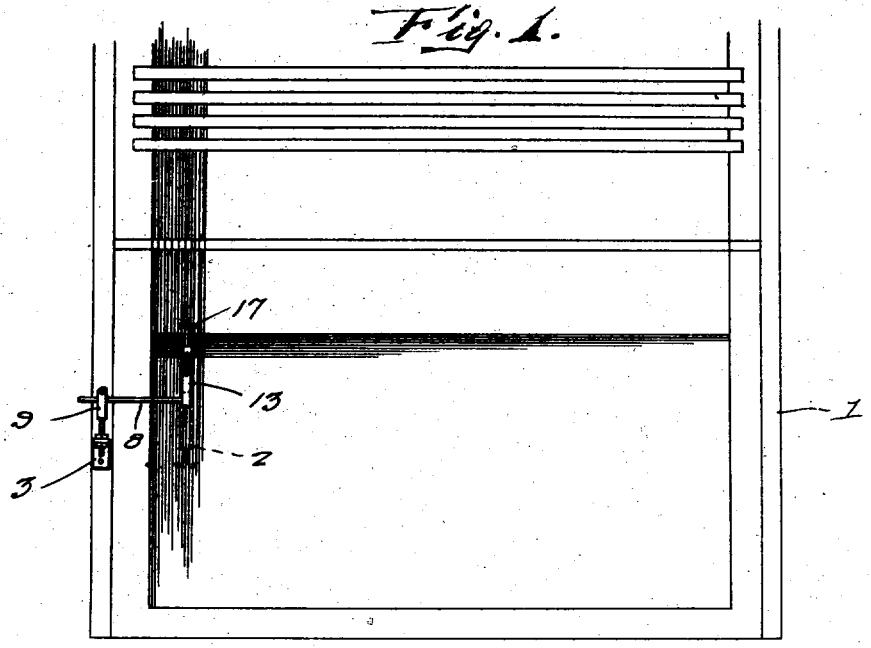
Figure 1 is a top plan view showing so much of a silk weaving loom as is necessary to illustrate the application of any invention, my novel gauge being shown in working position by full lines and in idle position by dotted lines.
Figure 2:
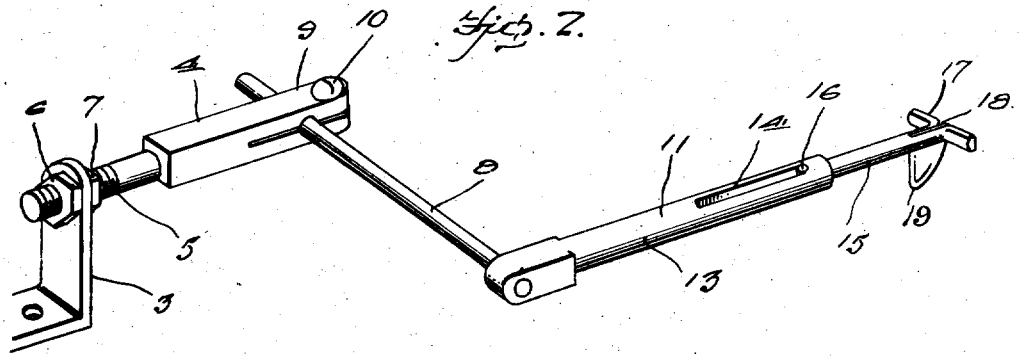
Fig. 2 is an enlarged perspective showing my improvements per se.

I show in Figure 1 a portion of the frame 1 of a silk loom, and in furtherance of the preferred embodiment of my invention a bracket 3 is superposed on and fixed to one of the sides of the said frame, the said bracket having an upstanding portion from which extends toward the reed a carrying member 4. The said carrying member for adjustment purposes is threaded at 5, and is loosely extended through an aperture in the bracket, and is equipped at opposite sides of said bracket with nuts 6 and 7. Manifestly by virtue of this provision, the carrying member 4 may be nicely adjusted with respect to the bracket. Connected to and extending laterally from the carrying member 4 is a rod 8, the said rod being designed to overhang the woven cloth as appears in Figure 1. The said rod 8 is in the nature of a rock shaft and is preferably associated with the carrying member 4 in such manner that the element 8 may be adjusted in the direction of its length. It is within the purview of my invention to connect the elements 4 and 8 in any manner consonant with the adjustable capacity ascribed to the rod 8. I prefer, however, to bifurcate the forward portion of the carrying member 4 to provide clamping jaws 9 which are connected by a screw 10 as best shown in Figure 2.

Figure 3:
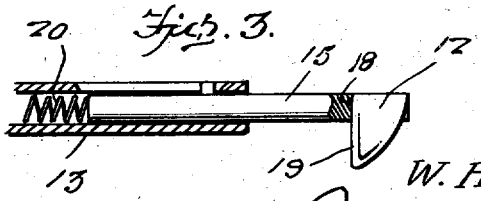
Fig. 3 is an enlarged detail view showing the cloth engaging part of the improvement.

In addition to the elements named, my improvement includes an arm 11 which extends from the rod 8 toward the reed, and is provided at its extremity with a cloth engaging element 12. The arm 11 is swingable in a vertical plane so as to be capable of being placed in idle position over the woven cloth as appears in dotted line 2 in Figure 1. Said arm 11 characterized by the cloth engaging element 12 may be of any construction consonant with the purposes of my invention, though I prefere to have the arm comprise a tubular portion 13 on the rod 8, and provided with a longitudinal slot 14 and a plunger 15 telescopically arranged in the tubular portion 13 and having a stud 16 movable in the slot 14 and also having at its forward end a T-head 17, the oppositely directed portions of which are separated by an intervening space or bifurcation 18 in which is located the cloth engaging element 12, the said element 12 being illustrated as in the form of a knife blade with a sharpened rear edge 19 disposed at right angles to the plunger 15. A spring 20 is arranged in the tube 13 and back of the plunger 15 for the purpose of enabling the plunger to move toward the left in Figure 3 for an important purpose hereinafter set forth.

On account of the lightness of the engagement there is no liability of the sharpened rear edge 19 of the blade or element 12 cutting or fraying the strands of the fabric.

The primary purpose of my improvement is to render it feasible to avoid the leaving of marks in crêpe cloth when the loom is stopped in order to permit of the picking out of any flaws that may be woven into the cloth, and to accurately stop the loom in such manner that a perfect joining is attained. After sufficient filling has been picked out or removed for the elimination of the flaw developed in the silk it is essential that the cloth be again tightened. Heretofore it has been practically impossible to tighten the cloth without the leaving in the cloth of a heavy mark or else leaving in the cloth an open space at the point where the weaving was resumed. My novel device has been successfully used in practice, and has practically demonstrated its capacity to eliminate the objectionable condition referred to in the weaving of crêpe cloth. This will be readily appreciated when it is stated that when the weaving of the cloth is to be resumed subsequently to the elimination of a flaw, the cloth is loosened so that the woven cloth goes back toward the harness to the extent of about a half of an inch. The gauge is then tipped forwardly or toward the harness so as to occupy the full line position shown in Figure 1. The cloth is then tightened until the element 12 designated the cloth engaging element drops over the edge of the woven cloth and between threads of the warp. When the element 12 so drops, the cloth is in precisely the correct position for a resumption of the weaving operation, and thereupon the gauge is swung back to the idle dotted line position shown in Figure 1 and the weaving is resumed, and by virtue of the operation set forth the cloth will be without any signs or marks because of the stoppage alluded to.

The arm or member 11 and blade 12 carried thereby are movable in a plane extending between two of the warp threads, whereby the blade or element 12 may readily pass between said threads, said blade or element being thin transversely of itself and the threads so as to pass readily between the threads, and being elongated longitudinally of the threads and vertically so as to be capable of riding on the cloth, when the cloth is returned slightly for removal of flaws, until the cloth is restored to weaving position. The edge 19 of the blade is at right angles with the arm 11 and is perpendicular with the cloth in the active position of the gauge, so as to extend at right angles across the edge of the cloth when the blade moves between the warp strands. The forward edge of the blade is curved so that the blade may ride on the cloth without catching the woof threads while the cloth is being adjusted to weaving position after the flaws have been removed.

The spring 20 serves the important function of averting damage to the reed in the event of the weaver forgetting to position the gauge on the woven cloth before starting the loom.

Notwithstanding the important capacity of function ascribed to my novel gauge, it will be noted that the gauge is simple and inexpensive in construction, is easy to install and is convenient to operate in the manner and for the purposes indicated.

While I have precisely described the illustrated embodiment of my invention in order to impart an exact understanding of said embodiment in all of its details, I do not desire, to be understood as confining myself to the specific construction, and relative arrangement of parts as shown, my invention being defined by my appended claims within the scope of which structural modifications and modifications in arrangement may be made without departure from my invention.

Having described my invention, what I claim and desire to secure by Letters Patent, is:—

1. A loom attachment for the purpose set forth, comprising a bracket adapted to be fixed on one side of a loom frame, a carrying member connected to said bracket and extending therefrom toward the reed, a rod adjustably connected to said carrying member and extending laterally therefrom and adapted to overhang the woven cloth in a loom, an arm vertically swingable on said rod and extending in the direction of the length of the cloth, and an element carried by said arm and adapted to drop over the edge of the woven cloth and between the warp threads, the said elements being spring influenced and being arranged to avert damage to the reed in the event of the weaver forgetting to position the gauge on the woven cloth before starting the loom.

2. A loom attachment for the purpose set forth, comprising a bracket adapted to be fixed to one side of a loom frame, a carrying member connected to said bracket and extending therefrom toward the reed, a rod adjustably connected to said carrying member and extending laterally therefrom and adapted to overhang the woven cloth in a loom, an arm vertically swingable on said rod and extending in the direction of the length of the cloth, and an element carried by said arm and adapted to drop over the edge of the woven cloth and into the wrap threads; the arm including a spring backed plunger, and the plunger having a T-head and a bifurcation between the oppositely directed portions of the T-head, and the said cloth engaging element being in the form of a knife blade disposed and fixed in the said bifurcation.

3. The combination of a plunger for the purpose set forth, said plunger having a T-head and a bifurcation between the oppositely directed portions of said T-head, and an element for dropping over the edge of woven cloth and into warp threads; the said element being in the form of a knife blade, and being fixed in said bifurcation.

4. A gauge for looms comprising a blade and means for mounting same for movement in a plane lying between two warp threads to move between said threads, said blade having one edge adapted to ride on the finished cloth and having another edge to drop across the edge thereof between said threads.

5. A gauge for looms comprising a blade and means for mounting same for movement in a plane lying between two warp threads to move between said threads, said blade being adapted to ride on the finished cloth and having a forward curved edge and a rear edge to drop across the edge of the cloth substantially perpendicular to the cloth.

6. A gauge for looms comprising an arm, means for mounting said arm for swinging movement above the finished cloth of a loom in a plane lying between two warp threads, and a blade carried by said arm adapted to pass between said threads, said blade having one edge adapted to ride on the cloth after it is returned slightly for the removal of flaws and having another edge adapted to drop across the edge of the cloth between said threads when the cloth is restored to weaving position.

7. A gauge for looms comprising an arm, means for mounting said arm for swinging movement above the finished cloth of a loom in a plane lying between two warp threads, and a blade carried by said arm to pass between said threads, said blade being adapted to ride on the finished cloth after it is returned slightly for the removal of flaws, the blade having a forward curved edge and a rear edge to extend across the edge of the finished cloth when it is restored to weaving position, and said rear edge of the blade being substantially perpendicular with the cloth when said blade passes between said threads.

8. A gauge for looms comprising an arm, means for mounting same for swinging movement immediately above the finished cloth of a loom in a plane lying between two warp threads, and a blade carried by said arm to extend downwardly between said threads and having a rear edge substantially at right angles with the arm, said blade having an edge in front of said rear edge to bear slidably on the finished cloth after the cloth is returned slightly for the removal of flows.

9. A gauge for looms comprising an arm, means for mounting same for swinging movement immediately above the finished cloth of a loom in a plane lying between two warp threads, and a blade carried by said arm to extend downwardly between said threads and having a rear edge substantially at right angles with the arm and having a forward curved edge.

In testimony whereof I affix my signature.

WALLACE H. O'NEILL.